US010204174B2

(12) United States Patent
Kim et al.

(10) Patent No.: US 10,204,174 B2
(45) Date of Patent: Feb. 12, 2019

(54) EFFICIENT METHOD FOR SUBGRAPH PATTERN MATCHING

(71) Applicant: Oracle International Corporation, Redwood Shores, CA (US)

(72) Inventors: Jinha Kim, Sunnyvale, CA (US); Oskar Van Rest, Mountain View, CA (US); Sungpack Hong, Palo Alto, CA (US); Hassan Chafi, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 532 days.

(21) Appl. No.: 14/969,789

(22) Filed: Dec. 15, 2015

(65) Prior Publication Data

US 2017/0169133 A1 Jun. 15, 2017

(51) Int. Cl.
*G06F 17/30* (2006.01)

(52) U.S. Cl.
CPC .. *G06F 17/30958* (2013.01); *G06F 17/30324* (2013.01)

(58) Field of Classification Search
CPC ..................... G06F 17/30958; G06F 17/30324
See application file for complete search history.

(56) References Cited

U.S. PATENT DOCUMENTS 9,275,422 B2 3/2016 Aksu et al.
9,400,834 B2 7/2016 Davies
9,529,887 B2 12/2016 Davies
9,996,567 B2 * 6/2018 Smart ............... G06F 17/30333
2012/0310916 A1 * 12/2012 Abadi .............. G06F 17/30445 707/713
2014/0244687 A1 * 8/2014 Shmueli ........... G06F 17/30587 707/780
2015/0026158 A1 * 1/2015 Jin ................... G06F 17/30958 707/722
2015/0379158 A1 * 12/2015 Infante-Lopez ............................ G06F 17/30958 707/798
2017/0060958 A1 3/2017 Van Rest et al.
2017/0147706 A1 5/2017 Roth et al.
2018/0004751 A1 * 1/2018 Vikhe ................ G06F 17/3053

* cited by examiner

*Primary Examiner* — Alicia M Willoughby
(74) *Attorney, Agent, or Firm* — Hickman Palermo Becker Bingham LLP

(57) ABSTRACT

Techniques herein optimize subgraph pattern matching. A computer receives a graph vertex array and a graph edge array. Each vertex and each edge has labels. The computer stores an array of index entries and an array of edge label sets. Each index entry corresponds to a respective vertex originating an edge and associates an offset of the edge with an offset of the respective vertex. Each edge label set contains labels of a respective edge. The computer selects a candidate subset of edges originating at a current vertex. The edge labels of each candidate edge of the candidate subset include a same particular query edge labels. The computer selects the candidate subset based on the index array and afterwards selects a result subset of vertices from among the terminating vertices of the candidate edges. The labels of each vertex of the result subset include a same particular query vertex labels.

20 Claims, 8 Drawing Sheets

COMPUTER 100

VERTEX ARRAY 130

| VERTEX OFFSET | VERTEX | LABELS | | |
|---|---|---|---|---|
| 0 | VERTEX 111 | V | Y | |
| 1 | VERTEX 112 | W | X | Z |
| 2 | VERTEX 113 | X | | |
| 3 | VERTEX 114 | X | Z | |

EDGE ARRAY 140

| EDGE OFFSET | EDGE | LABELS | | | ORIGINATING VERTEX |
|---|---|---|---|---|---|
| 0 | EDGE 121 | a | c | | VERTEX 113 |
| 1 | EDGE 122 | a | c | | VERTEX 113 |
| 2 | EDGE 123 | b | | | VERTEX 113 |
| 3 | EDGE 124 | a | b | c | VERTEX 113 |
| 4 | EDGE 125 | a | b | | VERTEX 114 |

INDEX ARRAY 150

| VERTEX OFFSET | FIRST EDGE OFFSET |
|---|---|
| 0 | 0 |
| 1 | 0 |
| 2 | 0 |
| 3 | 4 |
| 4 | 5 |

EDGE LABELS ARRAY 160

| EDGE OFFSET | LABELS | | |
|---|---|---|---|
| 0 | a | c | |
| 1 | a | c | |
| 2 | b | | |
| 3 | a | b | c |
| 4 | a | b | |

COMPUTER 100
CURRENT VERTEX OFFSET 110
VERTEX OFFSET 2
QUERY EDGE LABELS 175
a
c
CANDIDATE SUBSET 170
EDGE OFFSET
LABELS
0
a
c
1
a
c
3
a
b
c
QUERY VERTEX LABELS 185
X
Z
RESULT SUBSET 180
VERTEX
LABELS
VERTEX 112
W
X
Z
VERTEX 114
X
Z

FIG. 3

DUAL LABEL CACHES 300

| EDGE OFFSET | EDGE LABEL CACHE | | | TERMINATING VERTEX LABEL CACHE | | |
|---|---|---|---|---|---|---|
| 0 | a | c | | X | | |
| 1 | a | c | | W | X | Z |
| 2 | b | | | V | Y | |
| 3 | a | b | c | X | Z | |
| 4 | a | b | | W | X | Z |

COMPUTER 400
QUERY 490
EDGE LABELS SEQUENCE 475
DISTANCE 0
QUERY EDGE LABELS SET 471
c
DISTANCE 1
QUERY EDGE LABELS SET 472
a
b
c
DISTANCE 2
QUERY EDGE LABELS SET 473
a
b
VERTEX LABELS SEQUENCE 485
DISTANCE 0
QUERY VERTEX LABELS SET 481
X
DISTANCE 1
QUERY VERTEX LABELS SET 482
X
DISTANCE 2
QUERY VERTEX LABELS SET 483
W
X
Z
GRAPH 401
START {X}
{a,c}
{b}
{V,Y}
{a,b,c}
{a,c}
{X,Z}
{a,b}
END {W,X,Z}

FIG. 5

COMPUTER 500

| VERTEX BITMAP SCHEMA 502 | | | | |
|---|---|---|---|---|
| BIT 0 | BIT 1 | BIT 2 | BIT 3 | BIT 4 |
| V | W | X | Y | Z |

QUERY 590

| VERTEX LABELS SEQUENCE 585 | | |
|---|---|---|
| DISTANCE 0 | DISTANCE 1 | DISTANCE 2 |
| QUERY VERTEX LABELS SET 581<br>00100 = X | QUERY VERTEX LABELS SET 582<br>00100 = X | QUERY VERTEX LABELS SET 583<br>01101 = X,W,Z |

EFFICIENT METHOD FOR SUBGRAPH PATTERN MATCHING

FIELD OF THE DISCLOSURE

This disclosure relates to graph analysis by at least one computer. Techniques for pattern matching of vertices and edges during graph traversal are presented. These techniques are optimized to exploit data locality and minimize cache thrashing.

BACKGROUND

Graph databases support many types of applications such as semantic webs, molecular networks, and social networks. Along with graph analytics, subgraph pattern matching, which finds interesting portions of a large-scale graph, is an essential use of a graph database. Theoretically, subgraph pattern matching is nondeterministic polynomial (NP) complete, which means that it is inherently time-consuming. There are logical heuristics for accelerating graph pattern search, such as pruning unpromising graph portions early. Mechanisms for efficient access of data in memory are a subject of ongoing research.

Subgraph pattern matching entails finding, within a data graph, subgraphs that satisfy a matching semantic against a query graph. Two representative matching semantics are isomorphism and homomorphism. Formally, given a query graph Q(V,E,L) and a data graph G(V',E',L') where V and V' are vertex sets, E and E' are edge sets, and L and L' are labeling functions over vertexes or edges. The labeling function may return a set of labels. Under the isomorphism semantic, solving the subgraph pattern matching is equivalent to finding all mapping functions f:V→V' that satisfy the following conditions:

1. v V , L( v ) L'(f( v ))
2. (u, v ) E, (f(u), f( v )) E'
3. l (u, v ) E, L(u, v )=L'(f(u),f( v ))
4. if u v , then f(u) f( v )

Condition 1 says that the data vertex should have at least the label of the query vertex. Conditions 2 and 3 say that if two vertices are connected by an edge in a query graph, then two corresponding vertices in a data graph should be connected by an edge with the same edge label. Condition 4 says that two distinct query vertices cannot be mapped to a single data vertex. Under the homomorphism semantic, only conditions 1-3 are required to qualify as a matching subgraph. As such, the homomorphism semantic can be readily obtained by ignoring condition 4 from the isomorphism semantic. For example, a query graph matches a subgraph (or a mapping function) if the subgraph satisfies the isomorphism matching semantic: f(u1)=v1, f(u2)=v2, and f(u3) =v3.

Graph exploration is executed to find matching subgraphs. Traditionally this involved two primary steps. First, the vertices within a data graph, that satisfy the conditions for the first query vertex of a query graph, are collected. This collection is the root vertex set. Second, the graph exploration is executed by traversing the data graph from the root vertex set. This subtraversal stops if the pattern matching semantic is violated. Traversal can be done in either a breadth-first way, as with PGX.ISO, or a depth-first way, as with TurboISO. However, these particular implementations do not maximize throughput because they do not optimally use memory.

BRIEF DESCRIPTION OF THE DRAWINGS

In the drawings:

FIG. 3 is a block diagram that depicts an encoding of aspects of an example graph, in an embodiment;

FIG. 5 is a block diagram that depicts an encoding of aspects of an example graph within an example computer, in an embodiment;

DETAILED DESCRIPTION

Figure 1A:
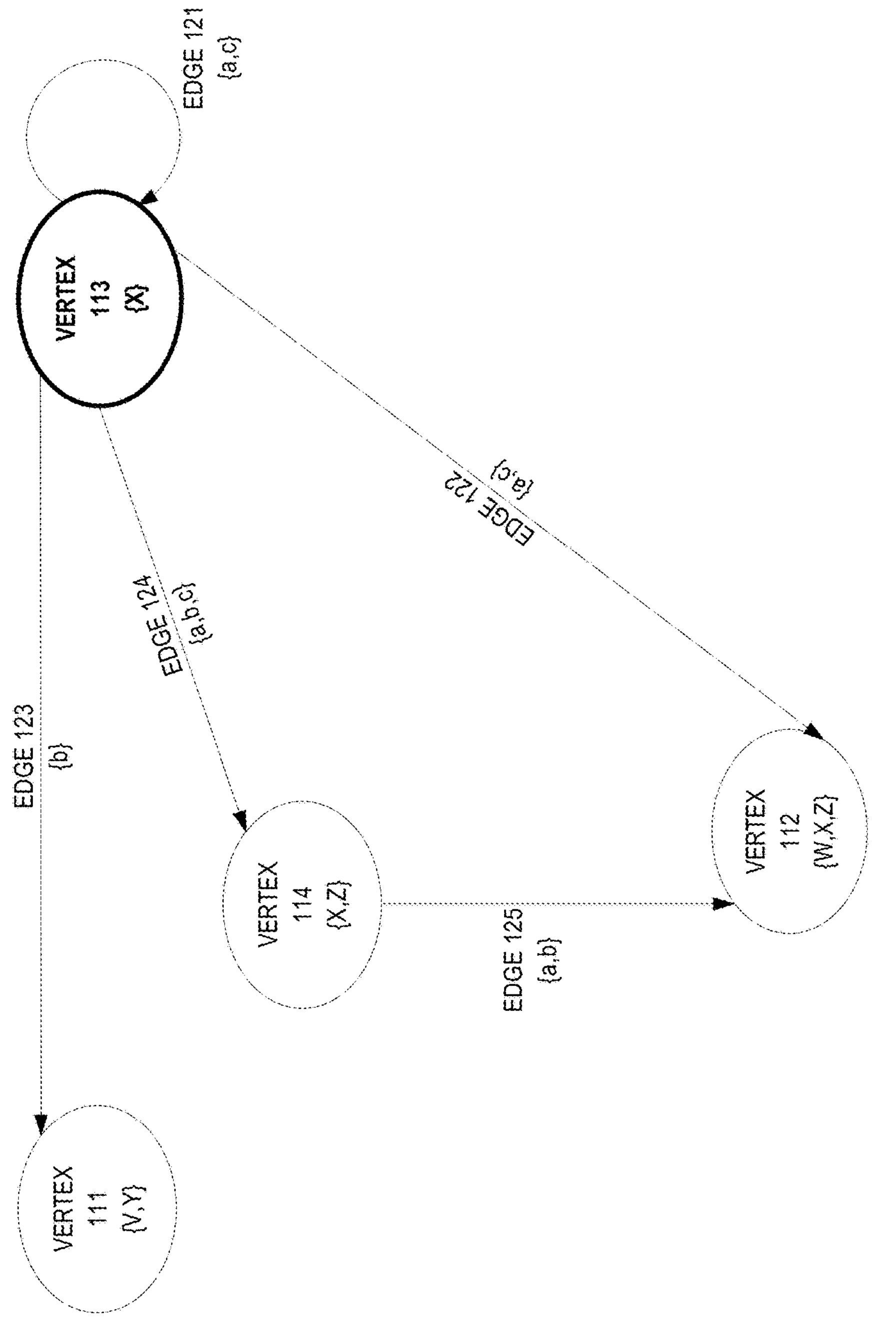
FIG. 1A is a block diagram that depicts an example graph, in an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Example Computer
2.1 Directed Graph
2.2 Data Structures
2.3 Efficient Edge Traversal
3.0 Example Subgraph Matching Process
3.1 Preparation
3.2 Traversal
4.0 Dual Label Caches
5.0 Compound Query
6.0 Labels Bitmap
7.0 Hardware Overview

1.0 General Overview

Computerized techniques are provided for improving performance of subgraph pattern matching by exploiting data locality and minimizing cache thrashing. In an embodiment, subgraph pattern matching is performed according to a matching order selection and graph exploration. The matching order selection sets an order in which sequence query vertices are matched. Graph exploration is executed to find matching subgraphs.

In an embodiment, edge labels are matched before neighbor vertex labels. When matching the neighbors of a vertex, a computer matches both the vertex label of the neighbor and the edge label of the edge between the current vertex and the neighbor. Checking the edge label matching condition first exploits the spatial locality by sequential memory access.

This technique is well suited for a breadth-first graph-traversal that finds subsgraph that match a pattern.

In an embodiment, labels are bitmap encoded. When there are few (e.g. no more than 64, the bit width of a machine word) distinct vertex labels or edge labels, sets of labels of a vertex are represented as a bitmap to reduce the memory usage and remove indirection in memory access.

In an embodiment, neighbor vertex labels are stored in a label cache. In an embodiment, the labels of neighbor vertices are stored with corresponding edge details to provide spatial locality.

In an embodiment, a computer receives a vertex array of vertices of a graph. Each vertex has one or more vertex labels. The computer also receives an edge array of edges. Each edge has one or more edge labels. Each edge originates at an originating vertex and terminates at a terminating vertex. The edge array is sorted by the offset of the originating vertex within the vertex array. The computer stores an index array of index entries. Each index entry corresponds to a respective vertex. The offset of each index entry within the index array is the same as the offset of the respective vertex within the vertex array. Each index entry associates an edge offset of an edge within the edge array with an offset of the respective vertex within the vertex array. The edge originates at the respective vertex. The edge offset is the least offset, within the edge array, of all edges that originate at the respective vertex. The computer also stores an edge labels array of edge label sets. Each edge label set corresponds to a respective edge. The offset of each edge label set within the edge labels array is the same as the offset of the respective edge within the edge array. Each edge label set contains the edge labels of the respective edge. The computer selects a candidate subset of edges that originate at a current vertex. The edge labels of each candidate edge of the candidate subset include a same one or more particular query edge labels. The computer selects the candidate subset based on the index array. After selecting the candidate subset, the computer selects a result subset of vertices from among the terminating vertices of edges of the candidate subset. The vertex labels of each vertex of the result subset include a same one or more particular query vertex labels.

2.0 Example Computer

Figure 1B:
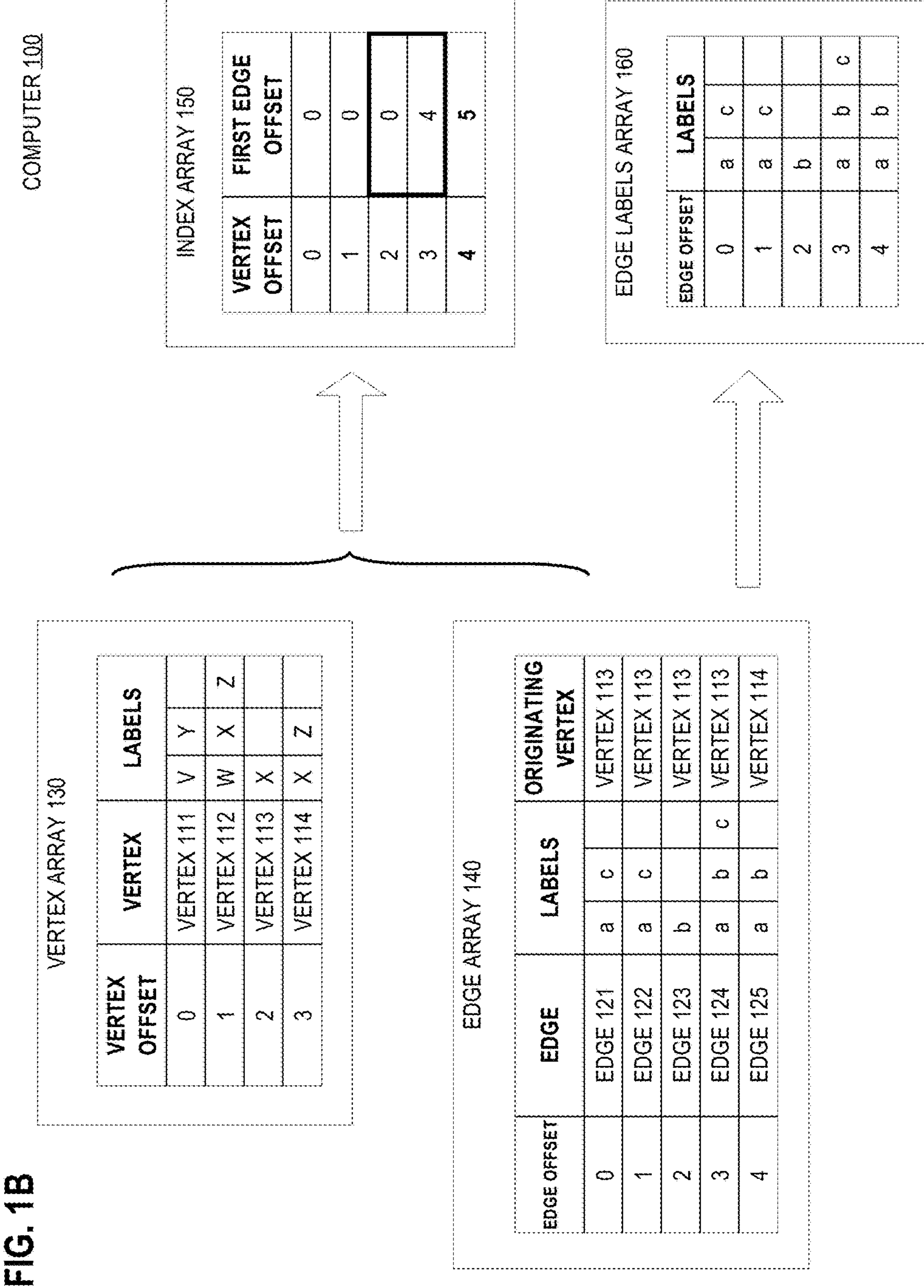
FIG. 1B is a block diagram that depicts an encoding of an example graph within an example computer, in an embodiment.
Figure 1C:
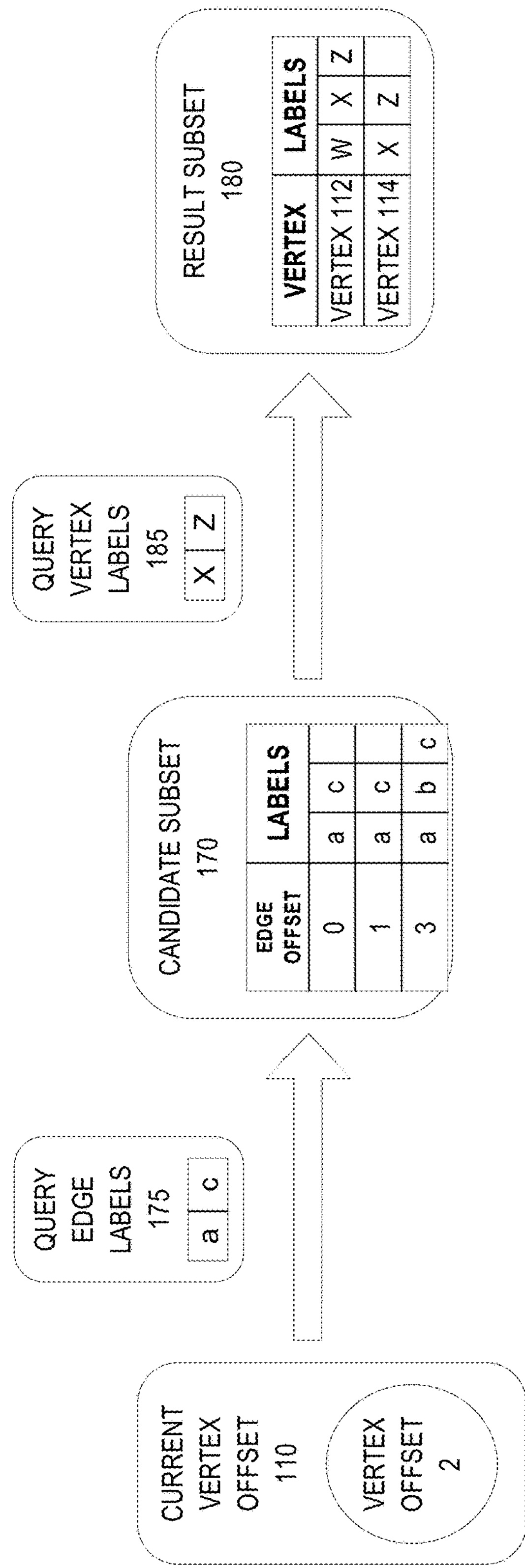
FIG. 1C is a block diagram that depicts an architecture for subgraph pattern matching within an example computer, in an embodiment.

FIGS. 1A-1C are block diagrams that depict portions of an example computer 100, in an embodiment. Computer 100 improves performance of subgraph pattern matching by minimizing random access of graph data.

2.1 Directed Graph

FIG. 1A depicts directed graph 101, which is a logical data structure that resides within computer 100. Computer 100 may have representations of directed graph 101 that reside on disk, in memory, or partly in both.

Directed graph 101 contains vertices such as 111-114, which are interconnected by edges such as 121-125. Because edges 121-125 are directed, each edge originates at an originating vertex and terminates at a terminating vertex. For example, edge 123 originates at vertex 113 and terminates at vertex 111.

Although at most one edge is shown between two vertices of directed graph 101, in practice any number of edges may connect the same two vertices. Likewise, directed graph 101 may have any number of vertices. For example, directed graph 101 may be a neural network having billions of vertices and trillions of edges.

Directed graph 101 may be disconnected, such as when a vertex has no edges. Directed graph 101 may be immutable.

Each of edges 121-125 has a set of labels, shown in curly braces. For example, edge 124 has three labels: a, b, and c. Each of vertices 111-114 has a set of labels, shown in curly braces. For example, vertex 114 has two labels: X and Z.

2.2 Data Structures

FIG. 1B depicts various data structures that represent aspects of directed graph 101, perhaps residing within the memory of computer 100. These data structures include arrays 130, 140, 150, and 160. Once created from directed graph 101, perhaps by computer 100, these arrays may be immutable.

Each vertex of directed graph 101 is represented as a row within vertex array 130. Vertex array 130 has three logical columns, which are vertex offset, vertex, and labels. The vertex offset column contains the offset within vertex array 130 of each row. The vertex offset column may be implicit and not actually stored.

The vertex column may store a vertex identifier of each vertex. The labels column stores the vertex labels of each vertex. Vertex array 130 may have other columns that contain other vertex data. Although the columns of vertex array 130 are shown together within a monolithic array, the columns of vertex array 130 may be stored as separate arrays that are logically parallel to each other. Separate arrays may improve data locality when one column is used more frequently than another column.

Each edge of directed graph 101 is represented as a row within edge array 140. Edge array 140 has four logical columns, which are edge offset, edge, labels, and originating vertex. The edge offset column contains the offset within edge array 140 of each row. The edge offset column may be implicit and not actually stored. The originating vertex column indicates from which vertex does each edge originate. The rows of edge array 140 are sorted on the originating vertex column by using the offset within vertex array 130 of the originating vertex as a sort key.

The edge column may store an edge identifier of each edge. The labels column stores the edge labels of each edge. Edge array 140 may have other columns that contain other edge data. Although the columns of edge array 140 are shown together within a monolithic array, these columns may be stored as separate arrays that are logically parallel to each other.

Vertex array 130 and edge array 140 may together be a complete encoding of the topology of directed graph 101. Arrays 150 and 160 are derived from arrays 130 and 140.

Edge labels array 160 is derived from edge array 140. Both arrays 140 and 160 have the same amount of rows, and each row represents some aspects of an edge.

Edge labels array 160 has two logical columns, which are edge offset and labels. The edge offset column is identical to the edge offset column of edge array 140. The edge offset column may be implicit and not actually stored. The labels column is identical to the labels column of edge array 140. Edge labels array 160 may have other columns that contain other edge data.

Index array 150 is derived from arrays 130 and 140. In an embodiment, both arrays 130 and 150 have the same amount of rows, and each row represents some aspects of a vertex.

Index array 150 has two logical columns, which are vertex offset and first edge offset. Index array 150 may have other columns that contain other vertex data or edge data.

The vertex offset column is identical to the vertex offset column of vertex array 130. The vertex offset column may be implicit and not actually stored.

The first edge offset column contains the offset of the first edge within edge array 140 that originates from the vertex of a row of index array 150. For example, the offset of vertex 113 within vertex array 130 is two. Edges 121-124 originate at vertex 113. Edges 121-124 occupy offsets zero thru three within edge array 140. Therefore, zero is the offset of the first edge within edge array 140 that originates from vertex 113. As such, the third row within index array 150 for vertex 113 has a vertex offset of two and a first edge offset of zero.

Construction and population of index array 150 may occur according to heuristics for boundary conditions. A vertex that originates no edges may repeat the value of the first edge offset column of the row above it. For example, vertex 112 originates no edges. Thus the first edge offset for vertex 112 (at vertex offset one within arrays 130 and 150) is copied from the row above it within index array 150, which has a value of zero. As such, the second row within index array 150 for vertex 112 has a vertex offset of one and a first edge offset of zero.

If the first vertex of index array 150 originates no edges, then it has no row above it from which to copy a value for the first edge offset column. In this case, the value for the first edge offset column defaults to zero. As such, the first row within index array 150 for vertex 111 has a vertex offset of zero and a first edge offset of zero.

As a consequence of how index array 150 is structured, computer 100 may use index array 150 to determine how many edges originate at a given vertex and what are the offsets of those edges within edge array 140. The offsets of those edges may be inferred to span a range of integers that is bounded by two adjacent values within the first edge offset column. For example, vertex 113 (at vertex offset two within arrays 130 and 150) originates four edges, whose offsets into edge array 140 are zero thru three. The offsets of these four edges span a range from zero inclusive to four exclusive, which are the two adjacent values shown inside the bold box that is drawn within first edge offset column.

In other words for a given vertex, the lower bound of its edge offset range is the value of the first edge offset column of the row within index array 150 for the given vertex. Whereas, the upper bound of that edge offset range is the value of the first edge offset of the next row within index array 150. However, the last vertex of index array 150 does not have a next row. This may be accommodated in two ways.

As shown, a dummy row that does not correspond to any vertex may be added to the end of index array 150. For example, vertex 114 (at vertex offset three within arrays 130 and 150) originates one edge, whose offset within edge array 140 is four. That edge offset is bounded by four inclusive and five exclusive. Therefore, index array 150 ends with a dummy row whose value of the first edge offset column is five. The two values of this dummy row are shown in bold. Alternatively, an embodiment may avoid having a dummy row and instead use the highest edge offset of edge array 140 as the value of the first edge offset column whenever such a value would be needed from the dummy row.

2.3 Efficient Edge Traversal

Arrays 130, 140, 150, and 160 may be used for edge traversal during graph exploration. FIG. 1C depicts operational structures that computer 100 may use for edge traversal. These operational structures include current vertex offset 110, query labels 175 and 185, and subsets 170 and 180.

Current vertex offset 110 indicates the offset within arrays 130 and 150 of which vertex of directed graph 101 is computer 100 currently visiting during graph exploration. As shown, vertex 113 is the current vertex 110. Graph exploration involves traversal of edges along their direction, such as during breadth first search. Hence, only edges that originate at current vertex 110 (vertex 113) can be traversed. As discussed above, vertex 113 originates four edges, 121-124, which computer 100 may determine by referencing index array 150.

However some of edges 121-124 may be irrelevant because they do not match given edge traversal criteria, shown as query edge labels 175. Because query edge labels 175 specifies a and c, computer 100 considers only those edges of 121-124 that have both of labels a and c. These matching edges are shown as candidate subset 170, which lacks edge 123 because edge 123 does not have labels a and c. As such, candidate subset 170 has edges 121-122 and 124, whose offsets within arrays 140 and 160 are zero, one, and three, which are shown within the edge offset column of candidate subset 170.

In order to determine the values of candidate subset 170, computer 100 accesses arrays 150 and 160, current vertex offset 110, and query edge labels 175 in ways discussed above. However for this, computer 100 need not access arrays 130 and 140 that actually encode directed graph 101. Access of data structures 110, 150, 160, and 175, but not 130 and 140 is important for data locality.

Arrays 130 and 140 encode raw vertices and edges and may also be rich with more data than shown. Consequently, arrays 130 and 140 may have large memory footprints that do not readily fit into a memory cache. Random access to either of arrays 130 or 140 during graph traversal may thrash the memory cache, thereby increasing storage drive traffic and reducing throughput. This may increase electricity consumption which, if computer 100 is mobile, may drain a battery.

However, data structures 110, 150, 160, and 175 do not encode raw vertices and edges. To the extent that the width (i.e. richness) of data structures 110, 150, 160, and 175 can be kept minimal, data structures 110, 150, 160, and 175 may maximize data locality, thereby fitting within a memory cache. That is why data structures 110, 150, 160, and 175 refer to vertices and edges by array offset only, thereby minimizing the memory footprints of data structures 110, 150, 160, and 175. Hence, data structures 110, 150, 160, and 175 improve the performance of computer 100, while it considers edges for traversal.

During edge traversal, computer 100 may apply other traversal criteria to constrain graph exploration, such as query vertex labels 185. Because query vertex labels 185 specifies X and Z, computer 100 considers only those vertices that terminate the edges of candidate subset 170 and that have both of labels X and Z.

The data structures and mechanisms for applying query vertex labels 185 are not discussed in this example, although they may or may not involve the same or similar data structures. Applying query vertex labels 185 to candidate subset 170 produces result subset 180, which consists of those vertices of directed graph 101 that satisfy query vertex labels 185 and are reached by traversing from the vertex of current vertex offset 110 along edges that satisfy query edge labels 175. The precise mechanics of applying query vertex labels, such as 185, are discussed in a later example.

Computer 100 applies query labels 175 and 185 in sequence to determine result subset 180. Either of query labels 175 and 185 may be applied first, without impacting correctness.

However because of the format of data structures 110, 150, 160, and 175, there may be significant performance advantages to applying query edge labels 175 first. This is because query edge labels 175 is applied to edges 121-124 that have details contiguously stored within edge labels array 160. That is, edges that originate from a same vertex are guaranteed to be contiguous within edge labels array 160.

As such, computer 100 may sequentially access the relevant rows (edge offsets 0-3) of edge labels array 160. Sequential access of contiguous data exploits data locality to avoid cache thrashing.

Although edges originating at a same vertex have contiguous data, neighboring vertices of that vertex have no such assurance of data locality. For example, vertex array 130 may have a million vertices. A vertex in the middle of vertex array 130 may be connected by edges to the first and last vertices of vertex array 130. As such, the middle vertex originates only two edges, and those edges are guaranteed to be adjacent within edge labels array 160, for maximum data locality.

Whereas the first and last vertices of vertex array 130, at which those two edges terminate, are not adjacent in any data structure presented above. As such, applying query vertex labels 185 involves referencing vertices that are separated by a million rows within arrays 130 and 150. Therefore, vertex data access necessarily involves random access instead of sequential access, unlike edge data access.

Furthermore, applying either of query labels 175 or 185 first may filter away some vertices or edges that lack particular labels, thereby leaving fewer rows to filter by whichever of query labels 175 or 185 is applied second. In other words, whichever of query labels 175 or 185 is applied first likely will have to process more rows than whichever is applied second. It is more efficient to apply query edge labels 175 first to the more rows, because it exploits sequential access. This reduces the amount of expensive random access when next applying query vertex labels 185 because fewer rows remain for processing.

3.0 Example Subgraph Matching Process

Figure 2:
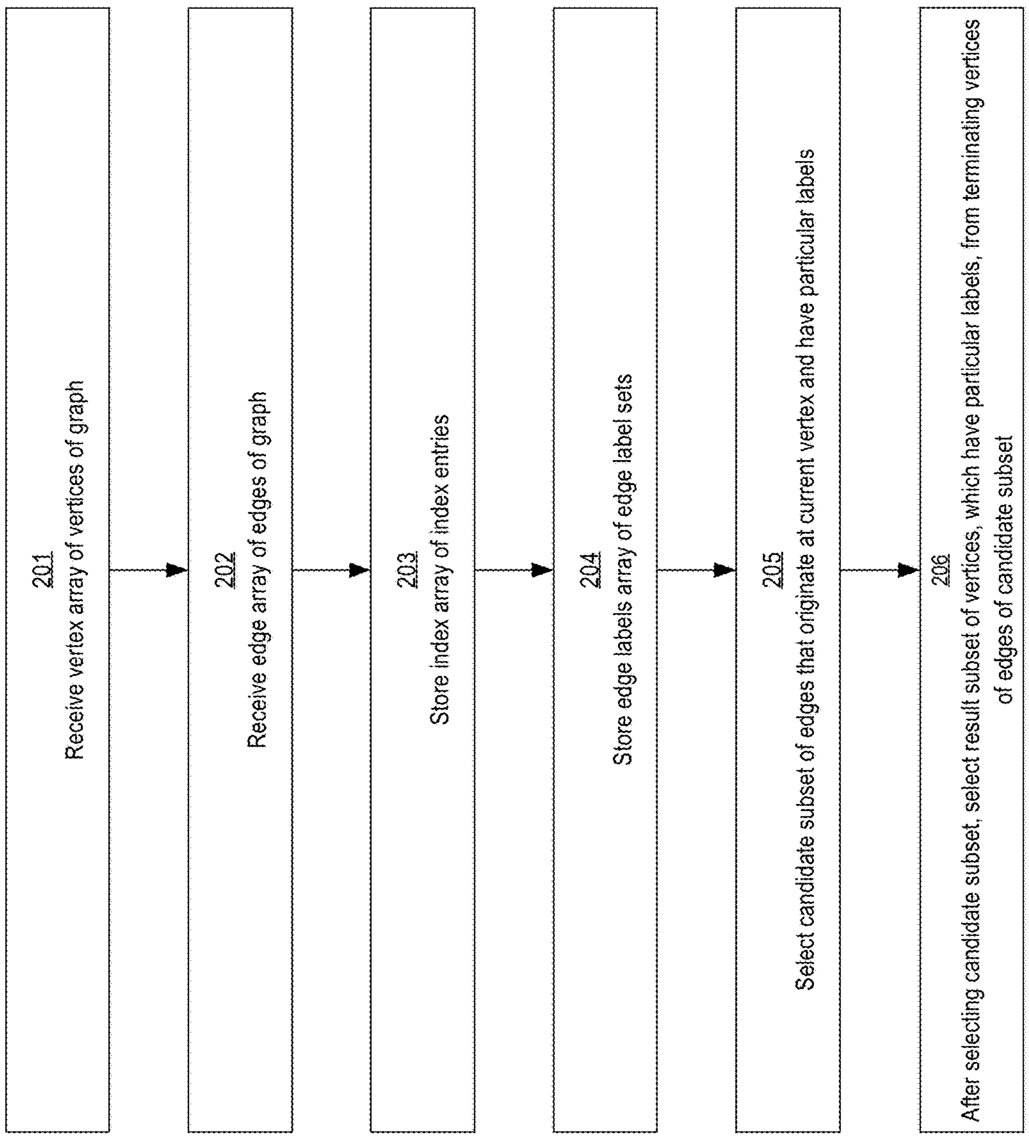
FIG. 2 is a flow diagram that depicts an example process for improving performance of subgraph pattern matching, in an embodiment.

FIG. 2 is a flow diagram that depicts an example process that improves performance of edge traversal according to edge criteria, in an embodiment. The edge traversal process is described in the context of FIG. 1.

3.1 Preparation

Steps 201-204 are preparatory and occur before graph exploration starts. In step 201, the vertices of a graph are received as a vertex array. For example, computer 100 receives vertex array 130. How receipt occurs depends on the implementation. For example, computer 100 may receive or generate directed graph 101, which computer 100 may use to generate vertex array 130 within memory. Alternatively, computer 100 may receive vertex array 130 from a file system, network, or other external interface. Either or both of directed graph 101 and vertex array 130 may reside in a memory-mapped file.

In step 202, the edges of the graph are received as an edge array. For example, computer 100 receives edge array 140. Mechanism by which this occurs may be the same as described for step 201.

Preparatory steps 201-202 need not involve substantial processing, if graph 101 and arrays 130 and 140 preexist with their final form and content. Preparatory steps 203-204 may also involve preexisting arrays. However because steps 203-204 are specific to the techniques herein, steps 203-204 are more likely to involve computation of array content.

In step 203, an index array is stored. For example, computer 100 may store index array 150 to disk or to memory after loading array 150 from disk. Alternatively as described above, computer 100 derives the content of index array 150 from arrays 130 and 140 and then stores index array 150 to memory or disk. For example, index array 150 may reside within a memory-mapped file.

In step 204, an edge labels array is stored. For example, computer 100 may store edge labels array 160 to disk or to memory after loading array 160 from disk. Alternatively, computer 100 derives the content of edge labels array 160 from array 140 and then stores edge labels array 150 to memory or disk. For example, edge labels array 150 may reside within a memory-mapped file.

After step 204, preparation is complete. Any data structures created during steps 201-204 may be saved to disk for use by other programs, for memory mapping of a file, or both.

3.2 Traversal

Steps 205-206 involve edge traversal within an iteration during an iterative graph exploration technique, such as breadth first search. Iteration may involve repeating steps 205-206 for each of many vertices in sequence.

In step 205, a candidate subset is selected to have edges that originate at a current vertex and have particular labels. For example, computer 100 populates candidate subset 170 with edges that originate at the vertex at current vertex offset 110 within vertex array 130. Computer 100 populates only with edges whose labels include at least the labels of query edge labels 175.

To accomplish step 205, computer 100 uses arrays 150 and 160. As described above, computer 100 uses index array 150 to determine what are the offsets of edges that originate at the current vertex.

Because these offsets are guaranteed to be contiguous within edge labels array 160, computer 100 may sequentially process the relevant rows of edge labels array 160. Such sequential processing maximizes data locality and cache performance.

For each of the relevant rows of edge labels array 160, computer 100 determines whether the labels of the row contain the labels of query edge labels 175. If the labels match for the row, then computer 100 adds the edge for that row to candidate subset 170. If no rows match query edge labels 175, then computer 100 does not proceed to step 206 for the current vertex. In this case, computer 100 may continue graph exploration by instead performing steps 205-206 by using other vertices as the current vertex.

For efficiency reasons explained above, step 206 should not be performed for a given current vertex until after step 205. In step 206, a result subset of vertices is selected to have vertices that terminate the edges of the candidate subset and have particular labels. For example, computer 100 populates result subset 180 with those vertices, reached by matching edges of candidate subset 170, whose labels include at least the labels of query vertex labels 185. Some mechanics of step 206 are explored in a later example herein.

In an embodiment and although not shown, edges and/or vertices of directed graph 101 have a data value paired with each label. For example, a label may be weight, and a value may be 200 pounds. As such, the edges and/or vertices have properties whose names are the labels.

After step 206, result subset 180 contains the particularly-labeled vertices that are neighbors of the current vertex and that terminate particularly-labeled edges. However, most graph exploration algorithms require traversals thru many vertices, not merely immediate neighbors. As such, computer 100 may repeat steps 205-206 with other vertices as a current vertex, such as the vertices of result subset 180. As such, computer 100 may incrementally walk directed graph 101 according to various label constraints and perhaps until directed graph 101 is exhausted.

In an embodiment, either or both of steps 205-206 are performed by a stored procedure of a database such as a graph database or a relational database.

4.0 Dual Label Caches

FIG. 3 depicts example dual label caches 300, in an embodiment. Dual label caches 300 enable a computer, such as computer 100 of FIG. 1B, to apply label criteria to edges and vertices using sequential access.

Dual label caches 300 includes two arrays, which are the edge label cache and the terminating vertex label cache. The edges of a graph have a corresponding row in each of the two arrays.

Because both arrays have the same amount of rows, both arrays may be fused into a single array. Alternatively, the arrays may be physically separate, as shown by the bold vertical bar between them. The edge offset column may be implicit instead of actually stored.

Each row of the edge label cache stores the labels of an edge. The edge label cache is an implementation of edge labels array 160 of FIG. 1B, with the same sorting. The terminating vertex label cache also has the same sorting.

Each row of the terminating vertex label cache stores the labels of the vertex that terminates the edge of the corresponding row of the edge label cache. Between the edge label cache and the terminating vertex label cache, these dual caches 300 have all of the label data needed to filter vertices and edges by labels during graph exploration.

For example, a computer may use the edge label cache to filter edges during step 205 of FIG. 2. Whereas, the terminating vertex label cache may be used during step 206 to filter vertices.

To accomplish step 206, a computer may use the terminating vertex label cache in conjunction with candidate subset 170 and query vertex labels 185 to populate result subset 180 of FIG. 1B. Candidate subset 170 provides offsets of edges that originate from the current vertex and have particular labels.

These offsets are more or less guaranteed to be contiguous within edge labels array 160, except perhaps for small gaps introduced by edges that were excluded from candidate subset 170 only because they lacked particular labels. Because of the contiguity, the computer may sequentially process the relevant rows of the terminating vertex label cache. Such sequential processing maximizes data locality and cache performance.

For each of the relevant rows of the terminating vertex label cache, computer determines whether the labels of the row contain the labels of query vertex labels 185. If the labels match for the row, then the computer adds the vertex that terminates the edge for that row to result subset 180. As such, label-based filtration of vertices may be accomplished with mechanics similar to those of label-based filtration of edges as described above.

5.0 Compound Query

Figure 4:
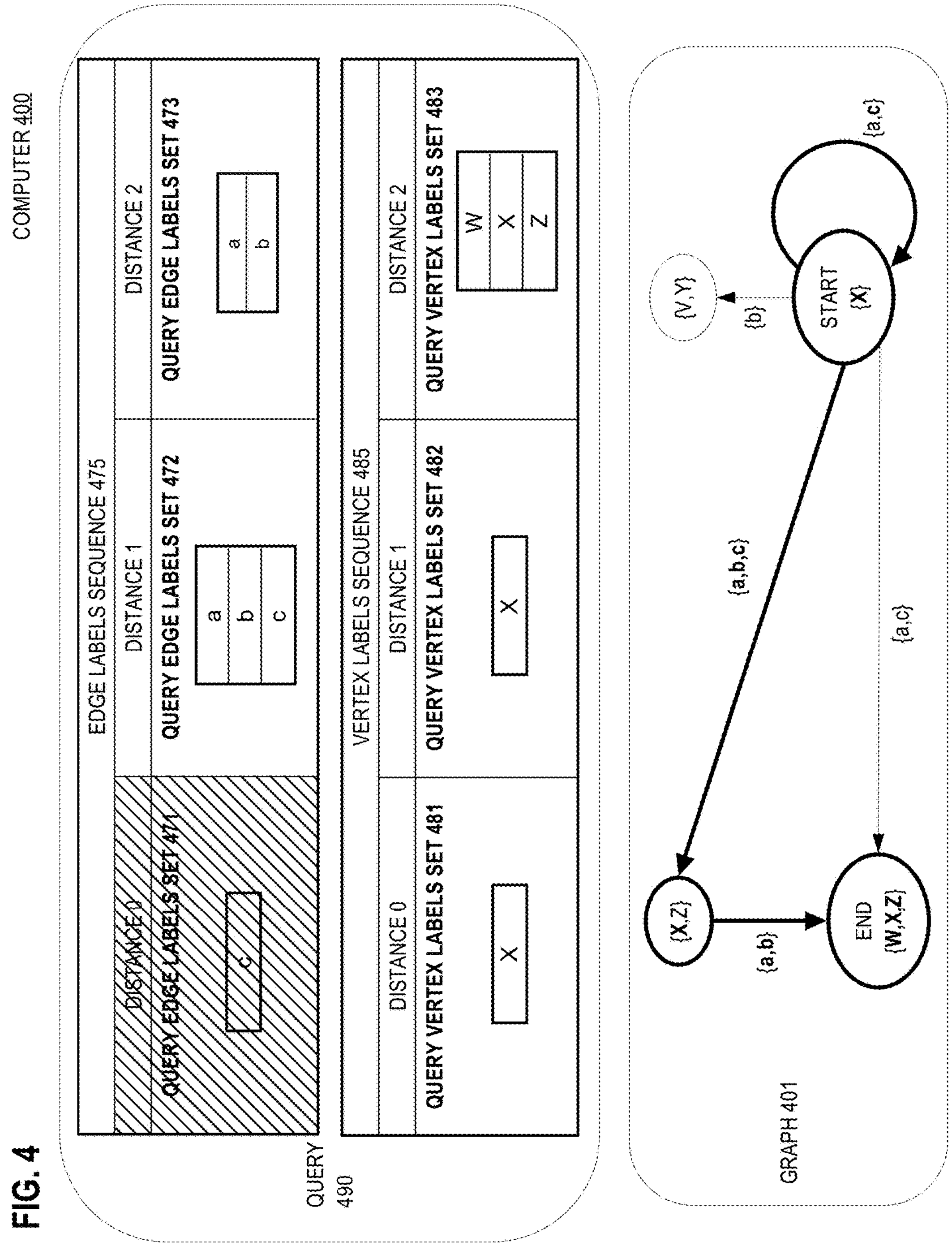
FIG. 4 is a block diagram that depicts an example graph query and an example graph within an example computer, in an embodiment.

FIG. 4 is a block diagram that depicts an example computer 400, in an embodiment. Computer 400 executes a compound query that specifies different filtration labels at different distances along a graph traversal. Computer 400 may be an implementation of computer 100.

Computer 400 includes graph 401 and receives query 490. The topology and other data of graph 401 may be encoded and stored according to the techniques and structures presented above. The vertices and edges of graph 401 have labels shown within curly braces.

Query 490 may be internally generated or received from a client program, which may be remote. Query 490 may be formatted according to a query language, such as standard query language (SQL), a graph query language like SPARQL, a document query language like XPath, a regular expression language, or other query grammar. In embodiments, query 490 may be applied to a graph that resides in a graph database or a resource description framework (RDF) triplestore.

Query 490 may be a graph query such as a regular path query that specifies particular labels for particular traversal distances. For example, vertices may represent cities and may be labeled according to name, population, and climate. Whereas, edges may represent roads and may be labeled according to lanes, tolls, and speed. As such query 490 may request all routes over a double-lane road to a tropical city, then over a double-lane toll road limited to 55 miles per hour to another tropical city, and finally over another toll road limited to 55 miles per hour to a tropical city named Miami and having a population exceeding a million people.

To encode such criteria, query 490 contains edge labels sequence 475 and vertex labels sequence 485. These labels sequences specify filtration labels to be applied at successive distances to either edges or vertices, such as distances 0-2.

The structure of labels sequences 475 and 485 may be the same. For example, each of labels sequences 475 and 485 may be an array. Each element of the array may be a set of labels, such as labels sets 471-473 and 481-483.

In operation, a computer may refer to query 490 as part of repeatedly applying the traversal filtration techniques presented above. For example the computer may do so iteratively as part of a breadth first search.

Given a particular city as an initial current vertex, the breadth first search may iteratively expand its search horizon (i.e. distance from initial vertex). At each distance, the computer may successively treat many vertices as the current vertex. For example after starting at one initial vertex, the computer may select many matching neighbor vertices and subsequently treat each neighbor as a current vertex.

The computer may sequentially process all vertices of a given distance from the initial vertex before incrementing the horizon by one and then processing all vertices of that increased distance. As such and according to breadth first search, the computer processes vertices of distance zero, then vertices of distance one, then distance two, and so forth.

At each particular distance, the computer may access a particular labels set of each of labels sequences 475 and 485 that corresponds to the distance of the current vertex from the initial vertex as already traversed. For example when the search begins at distance zero, the computer references query edge labels set 471 and query vertex labels set 481. The computer may use labels sets 471 and 481 to select matching initial vertices and matching edges that originate from those initial vertices.

In an embodiment, distance zero involves matching query edge labels set 471 to traverse from the current vertex. In such an embodiment, query vertex label set 481 must match a neighbor vertex of the current vertex.

In another embodiment, distance zero does not involve query edge labels set 471. Instead distance zero, unlike subsequent distances, involves only matching a query vertex labels set. Hence, query edge labels set is shown as shaded.

This is because at distance zero the sole task is to find a starting vertex. By definition, a starting vertex is reached without traversing an edge.

After initial vertices and their edges are processed, the computer increases the distance from zero to one. The computer performs the same techniques of vertex and edge filtration at distance one as it did at distance zero. However because the graph exploration is now at distance one, the computer applies labels sets 472 and 482 and does so to the neighbor vertices that were selected during the previous iteration at distance zero.

In that fashion, the particular label sets used for filtration are potentially different at each distance. The computer continues this process of iterating over increasing distances until a maximum distance is reached, which may be limited by either the amount of labels sets given in each of labels sequences 475 and 485, limited by an absence of vertices or edges with matching labels, or limited by the size of the graph itself.

In the case of graph 401 and query 490 as shown, a breadth first search results in identification of only one path that matches all labels of labels sequences 475 and 485. That one result path is shown in bold as beginning at the start vertex and ending at the end vertex.

In an embodiment, the computer identifies multiple matching subgraphs that satisfy query 490. Each matching subgraph has a sequence of vertices from within result subsets and/or edges from within candidate subsets of traversal iterations performed while executing query 490. For example, after a computer finds a matching subgraph, the computer may continue to search for other subgraphs that match the same query 490.

Embodiments may accommodate traversal boundary conditions in various ways. For example, a graph exploration may begin at a given initial vertex and then proceed first by filtering edges and then by filtering neighbor vertices. Alternatively, a graph exploration may use the first query vertex labels set, 481, to select initial vertices from all vertices of the graph.

Depending on these variations, it may be possible that only one of labels sequences 475 or 485 has both a query edge labels set and a query vertex labels set at one of the distance extremes (distance zero or the maximum distance of the sequence). For example, a query for two cities connected by one road may need two query vertex labels sets but only one query edge labels set. As such, the lengths of labels sequences 475 and 485 may differ by one.

As described above, query 490 supports conjunctive criteria terms. That is, when multiple labels are specified within a query labels set, a vertex or edge must have all of those labels in order to match. In an embodiment, query 490 also supports disjunction of criteria terms, such that multiple labels within a query labels set are treated as alternatives of which only one need match.

In an embodiment, query 490 supports disjunction of paths. For example, query 490 may request routes between miami and Seattle that only pass thru Detroit if no tolls are involved. Such a query specifies the union of routes that do not pass thru Detroit and those routes that do pass thru Detroit but avoid tolls.

Such disjunction may also be applied to sub-paths, instead of whole paths, such that only a portion of the paths are subject to alternation of criteria. For example, query 490 may request routes between Miami and Seattle either by way of New Orleans and Dallas or by way of Atlanta and Denver.

Although this example finds routes, these techniques may also be used to find arbitrary subgraphs such as those with multiple cycles and spurs. In an embodiment, either only vertices or only edges are subjected to criteria. In such an embodiment, query 490 needs either labels sequence 475 or 485 but not both.

6.0 Labels Bitmap

FIG. 5 is a block diagram that depicts an example computer 500, in an embodiment. Computer 500 uses a bitmap to reduce the memory footprint of each labels sequence.

Computer 500 may be an implementation of computer 100. Computer 500 includes query 590 and vertex bitmap schema 502.

Vertex bitmap schema 502 contains a bit for each distinct vertex label that appears within a graph. For example, bit zero designates the vertex label V.

Query 590 has vertex labels sequence 585 that specifies which labels serve as criteria at which distance. For example, query vertex labels sets 581-582 have a bitmap value of 00100, in which only bit two is set. Bit two designates the vertex label X. As such, matching vertices at distance zero and distance one must have labels that include at least X.

Whereas, query vertex labels set 583 has a bitmap value of 01101, in which bits one, two, and four are set. These bits that are set designate vertex labels W, X, and Z.

Although not shown, query 590 may also have an edge labels sequence that also uses bitmaps for its query edge labels sets. However because a graph may have different labels for vertices than for edges, computer 500 may have a different edge bitmap schema for all of the distinct edge labels of the graph.

A labels bitmap may need an octet (i.e. byte) for every eight distinct labels in a graph. This bitmap approach saves space when a graph has few distinct labels, but each vertex or edge has most of those labels on average.

Without a labels bitmap, a query labels set may instead use pointers to static strings, offsets into a global array of strings, or string buffers to designate labels. An offset must have at least one byte to reference a string within an array of at most 256 strings.

As such, a query labels set that uses one-byte offsets needs eight bytes to designate eight labels. Whereas, only one byte is needed to designate eight labels if a labels bitmap is used instead.

Hence, in many cases a labels bitmap may be more space efficient than alternatives. However if a graph has a multitude of labels, and each vertex or edge has only one or two labels, then a labels bitmap may be less space efficient than alternatives.

As described above, a computer generates vertex bitmap schema 502 and an edge bitmap schema as a preparatory step before any graph exploration occurs. Such bitmap schemas must have enough bits to cover all of the distinct labels in a graph. In an embodiment, both bitmap schemas are immutable and are implied rather than generated. For example, an implementation may be hard coded with knowledge that a graph may use only calendar months as labels and that twelve bits may implicitly represent those months in the correct ordering.

In an embodiment, the label caches (such as dual label caches 300 of FIG. 3) are bitmap encoded as described here.

In an embodiment, the size of vertex bitmap schema 502 and an edge bitmap schema are reduced by not generating those two bitmap schemas in advance of graph exploration.

Instead, whichever system generates query 590 also dynamically generates both bitmap schemas and embeds them within query 590.

For example, a graph may have thousands of distinct vertex labels. Whereas if a particular query 590 references only eight of those labels, then vertex bitmap schema 502 need only define a one-byte map. As such, the width of vertex bitmap schema 502 may vary amongst different queries 590 for a same graph, because each query 590 may reference a different amount of distinct labels.

7.0 Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
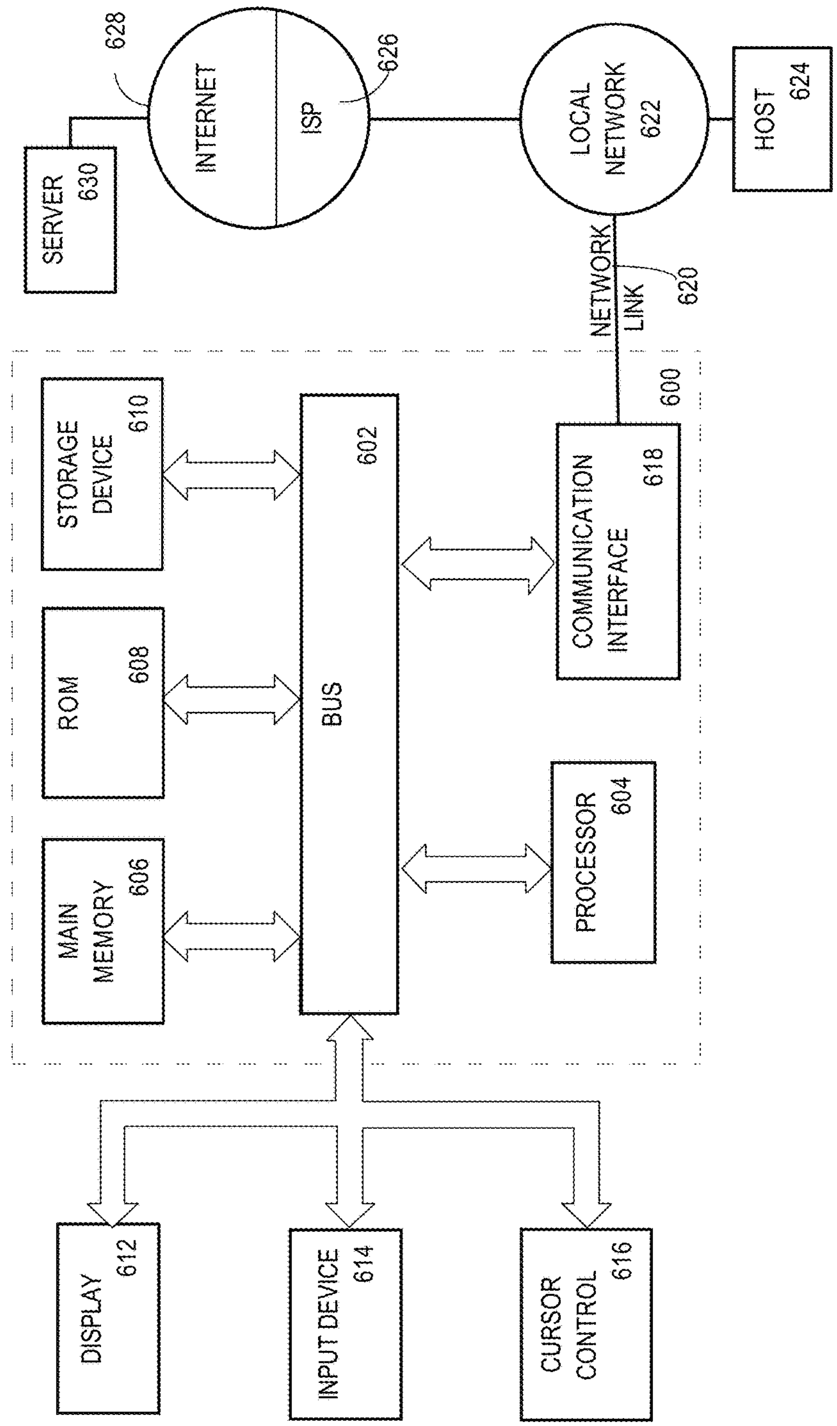
FIG. 6 is a block diagram that illustrates a computer system upon which an embodiment of the invention may be implemented.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:

receiving a vertex array of vertices of a graph, wherein each vertex of said vertex array comprises one or more vertex labels and has an offset within the vertex array;

receiving an edge array of edges, wherein each edge of said edge array: originates at a respective originating vertex of said vertex array, terminates at a terminating vertex of said vertex array, and comprises one or more edge labels;

wherein said edge array is sorted by the offsets of the originating vertices of respective edges within said vertex array;

storing an index array of index entries, wherein each index entry of said index array corresponds to a respective vertex of said vertex array, wherein the offset of said each index entry within said index array is the same as the offset of said respective vertex within said vertex array, wherein said each index entry associates an edge offset of an edge within said edge array with an offset of said respective vertex within said vertex array, wherein said edge originates at said respective vertex, wherein said edge offset is the least offset, within said edge array, of all edges that originate at said respective vertex;

storing an edge labels array of edge label sets, wherein each edge label set of said edge labels array corresponds to a respective edge of said edge array, wherein the offset of said each edge label set within said edge labels array is the same as the offset of said respective edge within said edge array, wherein said each edge label set contains the one or more edge labels of said respective edge;

selecting a candidate subset of edges that originate at a current vertex, wherein the one or more edge labels of each candidate edge of said candidate subset includes a same one or more particular query edge labels, wherein said selecting a candidate subset is based on said index array and said edge labels array;

after selecting said candidate subset, selecting a result subset of vertices from the terminating vertices of edges of said candidate subset, wherein the one or more vertex labels of each vertex of said result subset includes a same one or more particular query vertex labels;

wherein said method is performed by one or more computers.

2. The method of claim 1 wherein:

said each edge label set of said edge label sets is associated with said one or more vertex labels of the terminating vertex of the respective edge of said each edge label set; and said selecting a result subset is based on said index array.

3. The method of claim 1 wherein:

said method further comprises receiving a query that contains an edge label sequence of sets of one or more query edge labels and a vertex label sequence of sets of one or more query vertex labels;

said selecting said candidate subset and selecting said result subset are initially performed for each of a set of initial vertices of said graph;

said selecting said candidate subset and selecting said result subset are repeated in an iteration of iterations for each result of said result subset, said current vertex of said iteration comprises each result vertex of said result subset;

said one or more particular query edge labels comprises the edge label set at a particular offset within said edge label sequence;

said particular offset comprises a distance of said current vertex from a corresponding initial vertex of said set of initial vertices;

said one or more particular query vertex labels comprises the vertex label set at said particular offset within said vertex label sequence.

4. The method of claim 3 wherein:

the method further comprises collecting a set of matching subgraphs, of said graph, that satisfy said query;

each subgraph of said set of matching subgraphs comprises a sequence of vertices of said result subsets and/or edges of candidate subsets of said iterations.

5. The method of claim 1 further comprising:

associating a bit of a bitmap with each distinct vertex label of the vertices of said vertex array;

determining said one or more vertex labels of the vertices of said result subset based on said bitmap.

6. The method of claim 1 wherein said graph comprises resource description framework (RDF) triples.

7. The method of claim 1 wherein a stored procedure performs at least one of:

said selecting said candidate subset or said selecting said result subset.

8. The method of claim 1 wherein:

each of the one or more edge labels of each candidate edge of said candidate subset comprises a data value;

the one or more edge labels of each candidate edge of said candidate subset includes one or more particular query edge labels comprises said data value matches a particular data value.

9. The method of claim 1 wherein:

each of the one or more vertex labels of each vertex of said result subset comprises a data value;

the one or more vertex labels of each vertex of said result subset includes one or more particular query vertex labels comprises said data value matches a particular data value.

10. One or more non-transitory computer readable media storing instructions that, when executed by one or more processors, cause:

receiving a vertex array of vertices of a graph, wherein each vertex of said vertex array comprises one or more vertex labels and has an offset within the vertex array;

receiving an edge array of edges, wherein each edge of said edge array: originates at a respective originating vertex of said vertex array, terminates at a terminating vertex of said vertex array, and comprises one or more edge labels;

wherein said edge array is sorted by the offsets of the originating vertices of respective edges within said vertex array;

storing an index array of index entries, wherein each index entry of said index array corresponds to a respective vertex of said vertex array, wherein the offset of said each index entry within said index array is the same as the offset of said respective vertex within said vertex array, wherein said each index entry associates an edge offset of an edge within said edge array with an offset of said respective vertex within said vertex array, wherein said edge originates at said respective vertex, wherein said edge offset is the least offset, within said edge array, of all edges that originate at said respective vertex;

storing an edge labels array of edge label sets, wherein each edge label set of said edge labels array corresponds to a respective edge of said edge array, wherein the offset of said each edge label set within said edge labels array is the same as the offset of said respective edge within said edge array, wherein said each edge label set contains the one or more edge labels of said respective edge;

selecting a candidate subset of edges that originate at a current vertex, wherein the one or more edge labels of each candidate edge of said candidate subset includes a same one or more particular query edge labels, wherein said selecting a candidate subset is based on said index array and said edge labels array; and after selecting said candidate subset, selecting a result subset of vertices from the terminating vertices of edges of said candidate subset, wherein the one or more vertex labels of each vertex of said result subset includes a same one or more particular query vertex labels.

11. The one or more non-transitory computer readable media of claim 10 wherein:

said each edge label set is associated with said one or more vertex labels of said terminating vertex of said respective edge of said each edge label set; and said selecting a result subset is based on said index array.

12. The one or more non-transitory computer readable media of claim 10 wherein:

said instructions further cause: receiving a query that contains an edge label sequence of sets of one or more query edge labels and a vertex label sequence of sets of one or more query vertex labels;

said selecting said candidate subset and selecting said result subset to be initially performed for each of a set of initial vertices of said graph;

said selecting said candidate subset and selecting said result subset to be repeated in an iteration of iterations for each result vertex of said result subset, said current vertex of said iteration comprises each result vertex of said result subset;

said one or more particular query edge labels comprises the edge label set at a particular offset within said edge label sequence;

said particular offset comprises a distance of said current vertex from a corresponding initial vertex of said set of initial vertices;

said one or more particular query vertex labels comprises the vertex label set at said particular offset within said vertex label sequence.

13. The one or more non-transitory computer readable media of claim 12 wherein:

said instructions further cause identifying a set of matching subgraphs, of said graph, that satisfy said query;

each of said set of matching subgraphs comprises a sequence of vertices of said result subsets and/or edges of said candidate subsets of said iterations.

14. The one or more non-transitory computer readable media of claim 10 said instructions further cause:

associating a bit of a bitmap with each distinct vertex label of the vertices of said vertex array;

determining said one or more vertex labels of the vertices of said result subset based on said bitmap.

15. The one or more non-transitory computer readable media of claim 10 wherein said graph comprises resource description framework (RDF) triples.

16. The one or more non-transitory computer readable media of claim 10 wherein a stored procedure comprises at least one of: said selecting said candidate subset or said selecting said result subset.

17. The one or more non-transitory computer readable media of claim 10 wherein:

each of the one or more edge labels of each candidate edge of said candidate subset comprises a data value;

the one or more edge labels of each candidate edge of said candidate subset includes one or more particular query edge labels comprises said data value matches a particular data value.

18. The one or more non-transitory computer readable media of claim 10 wherein:

each of the one or more vertex labels of each vertex of said result subset comprises a data value;

the one or more vertex labels of each vertex of said result subset includes one or more particular query vertex labels comprises said data value matches a particular data value.

19. A system comprising:

a memory;

connected to said memory, one or more processors configured to:

store, in said memory, a vertex array of vertices of a graph, wherein each vertex of said vertex array comprises one or more vertex labels and has an offset within the vertex array;

store, in said memory, an edge array of edges, wherein each edge of said edge array: originates at a respective originating vertex of said vertex array, terminates at a terminating vertex of said vertex array, and comprises one or more edge labels;

wherein said edge array is sorted by the offsets of the originating vertices of respective edges within said vertex array;

store, in said memory, an index array of index entries, wherein each index entry of said index array corresponds to a respective vertex of said vertex array, wherein the offset of said each index entry within said index array is the same as the offset of said respective vertex within said vertex array, wherein said each index entry associates an edge offset of an edge within said edge array with an offset of said respective vertex within said vertex array, wherein said edge originates at said respective vertex, wherein said edge offset is the least offset, within said edge array, of all edges that originate at said respective vertex;

store, in said memory, an edge labels array of edge label sets, wherein each edge label set of said edge labels array corresponds to a respective edge of said edge array, wherein the offset of said each edge label set within said edge labels array is the same as the offset of said respective edge within said edge array, wherein said each edge label set contains the one or more edge labels of said respective edge;

selecting a candidate subset of edges that originate at a current vertex, wherein the one or more edge labels of each candidate edge of said candidate subset includes a same one or more particular query edge labels, wherein said selecting a candidate subset is based on said index array and said edge labels array;

after selecting said candidate subset, selecting a result subset of vertices from the terminating vertices of edges of said candidate subset, wherein the one or more vertex labels of each vertex of said result subset includes a same one or more particular query vertex labels.

20. The system of claim 19 wherein said each edge further comprises said one or more vertex labels of said terminating vertex of said each edge.

* * * * *

UNITED STATES PATENT AND TRADEMARK OFFICE

CERTIFICATE OF CORRECTION

PATENT NO. : 10,204,174 B2
APPLICATION NO. : 14/969789
DATED : February 12, 2019
INVENTOR(S) : Kim et al.

It is certified that error appears in the above-identified patent and that said Letters Patent is hereby corrected as shown below:

In the Specification

In Column 3, Line 2, delete "subsgraph" and insert -- subgraph --, therefor.

In Column 11, Line 57, delete "miami" and insert -- Miami --, therefor.

Signed and Sealed this
Twenty-eighth Day of January, 2020

Andrei Iancu
*Director of the United States Patent and Trademark Office*